US007966480B2

(12) United States Patent
Catherwood

(10) Patent No.: US 7,966,480 B2
(45) Date of Patent: Jun. 21, 2011

(54) REGISTER POINTER TRAP TO PREVENT ERRORS DUE TO AN INVALID POINTER VALUE IN A REGISTER

(75) Inventor: Michael I. Catherwood, Pepperell, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 920 days.

(21) Appl. No.: 11/016,798

(22) Filed: Dec. 20, 2004

(65) Prior Publication Data

US 2005/0172109 A1 Aug. 4, 2005

Related U.S. Application Data

(63) Continuation of application No. 09/870,446, filed on Jun. 1, 2001, now abandoned.

(51) Int. Cl.
*G06F 9/00* (2006.01)
(52) U.S. Cl. ........................... 712/244; 712/208
(58) Field of Classification Search .................. 712/227, 712/244
See application file for complete search history.

(56) References Cited

U.S. PATENT DOCUMENTS

| | | | | |
|---|---|---|---|---|
| 3,771,146 A * | 11/1973 | Cotton et al. ............... | 710/260 |
| 3,781,810 A | 12/1973 | Downing ................... | 340/172.5 |
| 3,886,524 A * | 5/1975 | Appelt ....................... | 710/110 |
| 3,930,253 A | 12/1975 | Maida ........................ | 340/347 |
| 4,025,771 A | 5/1977 | Lynch et al. ................ | 708/521 |
| 4,074,353 A | 2/1978 | Woods et al. ................ | 710/264 |
| 4,090,250 A | 5/1978 | Carlson et al. ............... | 712/234 |
| 4,323,981 A | 4/1982 | Nakamura ................... | 364/749 |
| 4,379,338 A | 4/1983 | Nishitani et al. ............. | 708/552 |
| 4,398,244 A | 8/1983 | Chu et al. .................... | 364/200 |
| 4,408,274 A | 10/1983 | Wheatley et al. ............ | 364/200 |
| 4,451,885 A | 5/1984 | Gerson et al. ................ | 708/200 |
| 4,472,788 A | 9/1984 | Yamazaki .................... | 364/900 |
| 4,481,576 A | 11/1984 | Bicknell ...................... | 364/200 |
| 4,488,252 A | 12/1984 | Vassar ......................... | 364/748 |

(Continued)

FOREIGN PATENT DOCUMENTS

EP 0 554 917 A2 8/1993

(Continued)

OTHER PUBLICATIONS

Tanenbaum (Structured Computer Organization Third Edition); 1990; pp. 11-13.*

(Continued)

*Primary Examiner* — Eddie Chan
*Assistant Examiner* — Keith Vicary
(74) *Attorney, Agent, or Firm* — King & Spalding L.L.P.

(57) ABSTRACT

Trap flags and a pointer trap are associated with registers in a processor. Each trap flag indicates whether a corresponding register has been written with valid data. If not, the trap flag is set to indicate that the register corresponding to the trap flag contains invalid data. During instruction processing, the pointer trap receives control signals from instruction fetch/decode logic on the processor indicating an instruction being processed calls for a register to be used as a pointer. If the specified pointer register has its corresponding trap flag set, then the pointer trap indicates that a processing exception has occurred. The interrupt logic/exception processing logic then causes a trap interrupt service routine (ISR) to be executed in response to the exception. The ISR prevents errors from being introduced in the instruction processing due to invalid pointer values.

26 Claims, 4 Drawing Sheets

U.S. PATENT DOCUMENTS

| | | | |
|---|---|---|---|
| 4,511,990 A | 4/1985 | Hagiwara et al. | 364/748 |
| 4,556,938 A | 12/1985 | Parker et al. | 364/200 |
| 4,615,005 A | 9/1986 | Maejima et al. | 713/601 |
| 4,626,988 A | 12/1986 | George | 364/200 |
| 4,709,324 A | 11/1987 | Kloker | 364/200 |
| 4,727,475 A * | 2/1988 | Kiremidjian | 710/104 |
| 4,730,248 A | 3/1988 | Watanabe et al. | 364/200 |
| 4,742,479 A | 5/1988 | Kloker et al. | 364/746 |
| 4,768,149 A | 8/1988 | Konopik et al. | 364/200 |
| 4,779,191 A | 10/1988 | Greenblatt | 711/2 |
| 4,782,457 A | 11/1988 | Cline | 364/715.04 |
| 4,800,524 A | 1/1989 | Roesgen | 364/900 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,841,468 A | 6/1989 | Miller et al. | 708/625 |
| 4,872,128 A | 10/1989 | Shimizu | 364/715.08 |
| 4,882,701 A | 11/1989 | Ishii | 364/900 |
| 4,926,371 A | 5/1990 | Vassiliadis et al. | 708/628 |
| 4,941,120 A | 7/1990 | Brown et al. | 364/748 |
| 4,942,524 A * | 7/1990 | Nunomura | 714/38 |
| 4,943,940 A | 7/1990 | New | 364/748 |
| 4,945,507 A | 7/1990 | Ishida et al. | 708/530 |
| 4,959,776 A | 9/1990 | Deerfield et al. | 364/200 |
| 4,977,533 A | 12/1990 | Miyabayashi et al. | 364/726 |
| 4,984,213 A | 1/1991 | Abdoo et al. | 365/230.03 |
| 5,007,020 A | 4/1991 | Inskeep | 364/900 |
| 5,012,441 A | 4/1991 | Retter | 364/900 |
| 5,032,986 A | 7/1991 | Pathak et al. | 364/200 |
| 5,034,887 A | 7/1991 | Yasui et al. | 364/200 |
| 5,038,310 A | 8/1991 | Akagiri et al. | 364/715.04 |
| 5,040,178 A | 8/1991 | Lindsay et al. | 371/21.5 |
| 5,056,004 A | 10/1991 | Ohde et al. | 264/200 |
| 5,099,445 A | 3/1992 | Studor et al. | 364/715.08 |
| 5,101,484 A | 3/1992 | Kohn | 395/375 |
| 5,117,498 A | 5/1992 | Miller et al. | 395/775 |
| 5,121,431 A | 6/1992 | Wiener | 713/174 |
| 5,122,981 A | 6/1992 | Taniguchi | 364/748 |
| 5,155,823 A | 10/1992 | Tsue | 395/400 |
| 5,177,373 A | 1/1993 | Nakamura | 307/265 |
| 5,197,023 A | 3/1993 | Nakayama | 364/748 |
| 5,197,140 A | 3/1993 | Balmer | 395/400 |
| 5,206,940 A | 4/1993 | Murakami et al. | 395/400 |
| 5,212,662 A | 5/1993 | Cocanougher et al. | 364/748 |
| 5,218,239 A | 6/1993 | Boomer | 307/443 |
| 5,239,654 A | 8/1993 | Ing-Simmons et al. | 395/800 |
| 5,276,634 A | 1/1994 | Suzuki et al. | 364/748 |
| 5,282,153 A | 1/1994 | Bartkowiak et al. | 364/716 |
| 5,327,543 A | 7/1994 | Miura et al. | 395/375 |
| 5,327,566 A | 7/1994 | Forsyth | 395/775 |
| 5,375,080 A | 12/1994 | Davies | 364/736.5 |
| 5,379,240 A | 1/1995 | Byrne | 364/715.08 |
| 5,386,563 A | 1/1995 | Thomas | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/725 |
| 5,448,703 A | 9/1995 | Amini et al. | 395/290 |
| 5,448,706 A | 9/1995 | Fleming et al. | 395/421.07 |
| 5,450,027 A | 9/1995 | Gabara | 326/98 |
| 5,463,749 A | 10/1995 | Wertheizer et al. | 395/437 |
| 5,469,377 A | 11/1995 | Amano | 364/748 |
| 5,471,600 A | 11/1995 | Nakamoto | 395/405 |
| 5,497,340 A | 3/1996 | Uramoto et al. | 364/745 |
| 5,499,380 A | 3/1996 | Iwata et al. | 395/800 |
| 5,504,916 A | 4/1996 | Murakami et al. | 395/800 |
| 5,506,484 A | 4/1996 | Munro et al. | 318/599 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | 364/745 |
| 5,561,384 A | 10/1996 | Reents et al. | 327/108 |
| 5,561,619 A | 10/1996 | Watanabe et al. | 364/736.5 |
| 5,561,774 A * | 10/1996 | Aikawa et al. | 712/244 |
| 5,564,028 A | 10/1996 | Swoboda et al. | 395/375 |
| 5,568,380 A | 10/1996 | Broadnax et al. | 364/184 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,604,864 A * | 2/1997 | Noda | 714/47 |
| 5,611,061 A | 3/1997 | Yasuda | 395/591 |
| 5,619,711 A | 4/1997 | Anderson | 395/800 |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | 395/733 |
| 5,649,146 A | 7/1997 | Riou | 395/421.07 |
| 5,651,121 A | 7/1997 | Davies | 395/376 |
| 5,657,484 A | 8/1997 | Scarrá | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,701,493 A | 12/1997 | Jaggar | 395/734 |
| 5,706,460 A | 1/1998 | Craig et al. | 395/380 |
| 5,706,466 A | 1/1998 | Dockser | 395/452 |
| 5,715,470 A | 2/1998 | Asano et al. | 395/800 |
| 5,737,570 A | 4/1998 | Koch | 395/872 |
| 5,740,095 A | 4/1998 | Parant | 364/760 |
| 5,740,419 A | 4/1998 | Potter | 395/588 |
| 5,740,451 A | 4/1998 | Muraki et al. | 395/733 |
| 5,748,516 A | 5/1998 | Goddard et al. | 364/748.03 |
| 5,748,970 A | 5/1998 | Miyaji et al. | 395/733 |
| 5,764,555 A | 6/1998 | McPherson et al. | 364/748.03 |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | 395/591 |
| 5,778,237 A | 7/1998 | Yamamoto et al. | 713/322 |
| 5,778,416 A | 7/1998 | Harrison et al. | 711/5 |
| 5,790,443 A | 8/1998 | Shen et al. | 364/746 |
| 5,808,926 A | 9/1998 | Gorshtein et al. | 364/748.11 |
| 5,812,439 A | 9/1998 | Hansen | 364/748.03 |
| 5,812,868 A | 9/1998 | Moyer et al. | 395/800.23 |
| 5,815,693 A | 9/1998 | McDermott et al. | 713/501 |
| 5,825,730 A | 10/1998 | Nishida et al. | 369/44.32 |
| 5,826,013 A * | 10/1998 | Nachenberg | 726/22 |
| 5,826,072 A | 10/1998 | Knapp et al. | 395/567 |
| 5,826,096 A | 10/1998 | Baxter | 395/800.24 |
| 5,828,875 A | 10/1998 | Halvarsson et al. | 395/588 |
| 5,862,065 A | 1/1999 | Muthusamy | 364/736.5 |
| 5,867,726 A | 2/1999 | Ohsuga et al. | 395/800.32 |
| 5,875,342 A | 2/1999 | Temple | 395/733 |
| 5,880,984 A | 3/1999 | Burchfiel et al. | 364/748.07 |
| 5,887,146 A * | 3/1999 | Baxter et al. | 710/104 |
| 5,892,697 A | 4/1999 | Brakefield | 364/748.02 |
| 5,892,699 A | 4/1999 | Duncan et al. | 364/760.4 |
| 5,894,428 A | 4/1999 | Harada | 364/724.03 |
| 5,900,683 A | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,918,252 A | 6/1999 | Chen et al. | 711/217 |
| 5,930,159 A | 7/1999 | Wong | 364/745.01 |
| 5,930,503 A | 7/1999 | Drees | 395/651 |
| 5,936,870 A | 8/1999 | Im | 364/745.03 |
| 5,937,199 A | 8/1999 | Temple | 395/335 |
| 5,938,759 A | 8/1999 | Kamijo | 712/209 |
| 5,941,940 A | 8/1999 | Prasad et al. | 708/523 |
| 5,943,249 A | 8/1999 | Handlogten | 364/748.02 |
| 5,944,816 A | 8/1999 | Dutton et al. | 712/215 |
| 5,951,627 A | 9/1999 | Kiamilev et al. | 708/404 |
| 5,951,679 A | 9/1999 | Anderson et al. | 712/241 |
| 5,973,527 A | 10/1999 | Schweighofer et al. | 327/172 |
| 5,974,549 A | 10/1999 | Golan | 713/200 |
| 5,978,825 A | 11/1999 | Divine et al. | 708/525 |
| 5,983,333 A | 11/1999 | Kolagotia et al. | 711/219 |
| 5,991,787 A | 11/1999 | Abel et al. | 708/400 |
| 5,991,868 A | 11/1999 | Kamiyama et al. | 712/32 |
| 5,996,067 A | 11/1999 | White | 712/224 |
| 6,002,234 A | 12/1999 | Ohm et al. | 318/729 |
| 6,009,454 A | 12/1999 | Dummermuth | 709/108 |
| 6,014,723 A | 1/2000 | Tremblay et al. | 711/1 |
| 6,018,757 A | 1/2000 | Wong | 708/525 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A | 4/2000 | Kolagotia et al. | 711/217 |
| 6,055,619 A | 4/2000 | North et al. | 713/36 |

| | | | | |
|---|---|---|---|---|
| 6,058,409 | A | 5/2000 | Kozaki et al. | 708/409 |
| 6,058,410 | A | 5/2000 | Sharangpani | 708/551 |
| 6,058,464 | A | 5/2000 | Taylor | 711/217 |
| 6,061,711 | A | 5/2000 | Song et al. | 709/108 |
| 6,061,780 | A | 5/2000 | Shippy et al. | 712/204 |
| 6,061,783 | A | 5/2000 | Harriman | 712/224 |
| 6,076,154 | A | 6/2000 | Van Eijndhoven et al. | 712/24 |
| 6,084,880 | A | 7/2000 | Bailey et al. | 370/395 |
| 6,101,521 | A | 8/2000 | Kosiec | 708/550 |
| 6,101,599 | A | 8/2000 | Wright et al. | 712/228 |
| 6,115,732 | A | 9/2000 | Oberman et al. | 708/625 |
| 6,128,728 | A | 10/2000 | Dowling | 712/228 |
| 6,134,574 | A | 10/2000 | Oberman et al. | 708/551 |
| 6,144,980 | A | 11/2000 | Oberman | 708/627 |
| 6,145,049 | A | 11/2000 | Wong | 710/267 |
| 6,181,151 | B1 | 1/2001 | Wasson | 324/765 |
| 6,192,447 | B1* | 2/2001 | Shand | 711/111 |
| 6,202,163 | B1 | 3/2001 | Gabzdyl et al. | 713/324 |
| 6,205,467 | B1 | 3/2001 | Lambrecht et al. | 709/108 |
| 6,209,086 | B1 | 3/2001 | Chi et al. | 712/244 |
| 6,243,786 | B1 | 6/2001 | Huang et al. | 710/262 |
| 6,243,804 | B1 | 6/2001 | Cheng | 712/228 |
| 6,260,162 | B1 | 7/2001 | Typaldos et al. | 714/55 |
| 6,282,637 | B1 | 8/2001 | Chan et al. | 712/223 |
| 6,292,866 | B1 | 9/2001 | Zaiki et al. | 710/264 |
| 6,295,574 | B1 | 9/2001 | MacDonald | 710/261 |
| 6,300,800 | B1 | 10/2001 | Schmitt et al. | 326/86 |
| 6,315,200 | B1 | 11/2001 | Silverbrook et al. | 235/454 |
| 6,356,970 | B1 | 3/2002 | Killian et al. | 710/269 |
| 6,363,522 | B1* | 3/2002 | Click et al. | 717/160 |
| 6,377,619 | B1 | 4/2002 | Denk et al. | 375/232 |
| 6,397,318 | B1 | 5/2002 | Peh | 711/220 |
| 6,412,081 | B1 | 6/2002 | Koscal et al. | 714/34 |
| 6,434,020 | B1 | 8/2002 | Lambert et al. | 363/17 |
| 6,487,654 | B2 | 11/2002 | Dowling | 712/244 |
| 6,523,108 | B1 | 2/2003 | James et al. | 712/224 |
| 6,552,625 | B2 | 4/2003 | Bowling | 332/109 |
| 6,564,315 | B1 | 5/2003 | Kim et al. | 708/513 |
| 6,633,970 | B1 | 10/2003 | Clift et al. | 712/217 |
| 6,634,020 | B1* | 10/2003 | Bates et al. | 717/131 |
| 6,643,150 | B2 | 11/2003 | Kawakami | 363/41 |
| 6,658,578 | B1 | 12/2003 | Laurenti et al. | 713/324 |
| 6,681,280 | B1 | 1/2004 | Miyake et al. | 710/261 |
| 6,694,398 | B1 | 2/2004 | Zhao et al. | 710/260 |
| 6,724,169 | B2 | 4/2004 | Majumdar et al. | 318/811 |
| 6,728,856 | B2 | 4/2004 | Grosbach et al. | 711/202 |
| 6,751,742 | B1 | 6/2004 | Duhault et al. | 713/323 |
| 6,763,478 | B1 | 7/2004 | Bui | 713/600 |
| 6,862,635 | B1* | 3/2005 | Alverson et al. | 710/52 |
| 2001/0013117 | A1* | 8/2001 | Ungar | 717/5 |
| 2002/0194466 | A1 | 12/2002 | Catherwood et al. | 712/241 |
| 2003/0093656 | A1 | 5/2003 | Masse et al. | 712/241 |
| 2004/0150439 | A1 | 8/2004 | Greenfeld | 327/131 |
| 2007/0038826 | A1* | 2/2007 | Dieffenderfer et al. | 711/163 |
| 2007/0113046 | A1* | 5/2007 | Vorbach et al. | 712/15 |
| 2008/0028262 | A1* | 1/2008 | Gellerich | 714/25 |

FOREIGN PATENT DOCUMENTS

| | | |
|---|---|---|
| EP | 0 855 643 A1 | 7/1998 |
| EP | 0 992 888 | 12/2000 |
| EP | 0 992 889 | 12/2000 |
| JP | 01037424 A | 2/1989 |
| WO | 96/11443 | 4/1996 |

OTHER PUBLICATIONS

Hennessy et al. (Computer Architecture: A Quantitative Approach), second edition 1996; pp. 75, 130.*
Parasoft: Insure++ User's Guide; http://web.archive.org/web/20000311085449/http://parasoft.com/products/insure/manuals/v4/unix/users/insguide.htm#REF36689 archived on Mar. 11, 2000; accessed Apr. 6, 2010; 17 pages.*
Sastry et al. (Better development with BoundsChecker); pp. 107-109, Jun. 1996.*
Leroy (Java Bytecode Verification: An Overview); Lecture Notes in Computer Science, 2001, vol. 2102/2001, pp. 265-285; Jul. 18-22, 2001.*
Moon B I et al.: "A 32-bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84-A No. 5, pp. 1339-1347, XP001060025 ISSN: 0916-8508, May 2001.
Turley J: "Balancing Conflicting Requirements When Mixing RISC, DSPs" Computer Design, Pennwell Publ. Littleton, Massachusetts, IS, vol. 37, No. 10, pp. 46, 48, 50-53, XP000860706 ISSN:0010-4566, Oct. 1998.
Levy M: "Microprocessor and DSP Technologies Unite for Embedded Applications" EDN Electrical Design News, Cahners Publishing Co., Newtown Massachusetts, US, No. Europe, pp. 73-74, 76, 78-80, XP000779113 ISSN: 0012-7515, Mar. 2, 1998.
Intel, Pentium Processor Family Developer's Manual, vol. 3: Architrecture and Programming Manual, , pp. 3-1, 3-2, 3-15, 14-1 to 14-30, 18-7, and 25-289 to 25-292, 1995.
Intel, Embedded Intel486 Processor Family Developer's Manual, pp. 2-2, 3-17, 3-37, 4-5, 4-6, 10-1 to 10-12, 12-1 to 12-10, Oct. 1997.
Moore, M "Z80 Family Interrupt Structure". Barleywood (online), retrieved from the internet <URL: http://www.gaby.de/z80/1653.htm>, 1997.
PCT Search Report based on PCT/US02/16706, 6 pages, Mailed Sep. 27, 2002.
PCT Search Report based on PCT/US02/16705, 7 pages, Mailed Sep. 9, 2002.
PCT Search Report based on PCT/US02/16921, 4 pages, Mailed Oct. 18, 2002.
SPARC, International, Inc., "The SPARC Architecture Manual", Version 8, pp. 1-303, 1992.
Weaver, et al., SPARC International, Inc. "The SPARC Arcitecture Manual", Version 9, pp. xiv, 137, 146-147, 200-204, 221-222, 234-236, 299, 1994-2000.
Free On-Line Dictionary of Computing (FOLDOC). htp://wombat.doc.ic.ac.uk/foldoc/ Search term: program counter, 1995.

* cited by examiner

REGISTER POINTER TRAP TO PREVENT ERRORS DUE TO AN INVALID POINTER VALUE IN A REGISTER

CROSS REFERENCE TO RELATED APPLICATION

This application is a continuation of U.S. application Ser. No. 09/870,446 entitled "Register Pointer Trap" which was filed by Michael I. Catherwood on Jun. 1, 2001 now abandoned and is assigned to the same entity as the present application.

FIELD OF THE INVENTION

The present invention relates to systems and methods for preventing processing errors in processors and, more particularly, to systems and methods for providing register pointer traps to identify registers having invalid data to prevent propagating processing errors due to these registers being used as pointers.

BACKGROUND OF THE INVENTION

After power is applied to a chip, registers and memory elements in general on the chip will assume values that are unpredictable and will contain data that is invalid. When the chip is a processor, this is not problematic unless a program resident on the processor tries to read memory elements prior to known values having been written into the memory elements. This may be particularly problematic when programs use a memory element, such as a register, as a pointer to a memory. In the latter scenario, the pointer is invalid, and its use will lead to processing errors.

To prevent processing errors, there is a need for a mechanism to identify when a memory element, such as a register, has invalid data in it. There is a further need to flag registers that have invalid data in them to prevent these registers from being used as pointers to memory.

SUMMARY OF THE INVENTION

According to embodiments of the present invention, trap flags and a pointer trap are associated with registers in a processor. Each trap flag indicates whether a corresponding register has been written with valid data. If not, the trap flag is set to indicate that the register corresponding to the trap flag contains invalid data. During instruction processing, the pointer trap receives control signals from instruction fetch/decode logic on the processor indicating an instruction being processed calls for a register to be used as a pointer. If the specified pointer register has its corresponding trap flag set, the then the pointer trap indicates that a processing exception has occurred. The interrupt logic/exception processing logic then causes a trap interrupt service routine (ISR) to be executed in response to the exception. The ISR prevents errors from being propagated during the ensuing instruction processing due to invalid pointer values.

According to one embodiment of the invention, a method of preventing processing errors due to invalid pointers includes fetching an instruction having a pointer operand for execution. The method further includes determining whether a trap flag corresponding to the pointer is in a set or reset condition and generating a trap control signal when the trap flag is in a reset condition. The method may further include executing the instruction and triggering a trap interrupt based on the trap control signal.

The trap flag corresponding to the pointer may be changed from the reset condition to the set condition based upon a write to the pointer. In addition, the trap flag may be changed to the reset condition after a power up or a reset of the processor.

According to another embodiment of the invention, a method of preventing processing errors due to invalid pointers includes providing trap flags, each corresponding to a pointer register. The trap flags are reset upon a power up or reset. Conversely, the trap flag corresponding to each pointer register are set based on the pointer register being written. A trap control signal may be generated when an instruction reads a pointer register with a trap flag set to reset. The trap control signal may trigger a trap interrupt.

According to still another embodiment of the invention, a processor prevents processing errors due to invalid pointers. The processor includes instruction fetch and decode logic, registers, trap flags and pointer trap logic. The instruction fetch and decode logic fetches and decodes instructions. The trap flags each correspond to a register and each indicate a set or reset condition. The pointer trap is coupled to the trap flags and generates a trap control signal based on decoding an instruction that reads a register that has a corresponding trap flag in a reset condition. The trap control signal may only be generated when the register being read from is acting as a pointer register.

BRIEF DESCRIPTION OF THE FIGURES

The above described features and advantages of the present invention will be more fully appreciated with reference to the detailed description and appended figures in which.

DETAILED DESCRIPTION

According to embodiments of the present invention, trap flags and a pointer trap are associated with registers in a processor. Each trap flag indicates whether a corresponding register has been written with valid data. If not, the trap flag is set to indicate that the register corresponding to the trap flag contains invalid data. During instruction processing, the pointer trap receives control signals from instruction fetch/decode logic on the processor indicating an instruction being processed calls for a register to be used as a pointer. If the specified pointer register has its corresponding trap flag set, then the pointer trap indicates that a processing exception has occurred. The interrupt logic/exception processing logic then causes a trap interrupt service routine (ISR) to be executed in response to the exception. The ISR prevents errors from being propagated during the ensuing instruction processing due to invalid pointer values.

Figure 1:
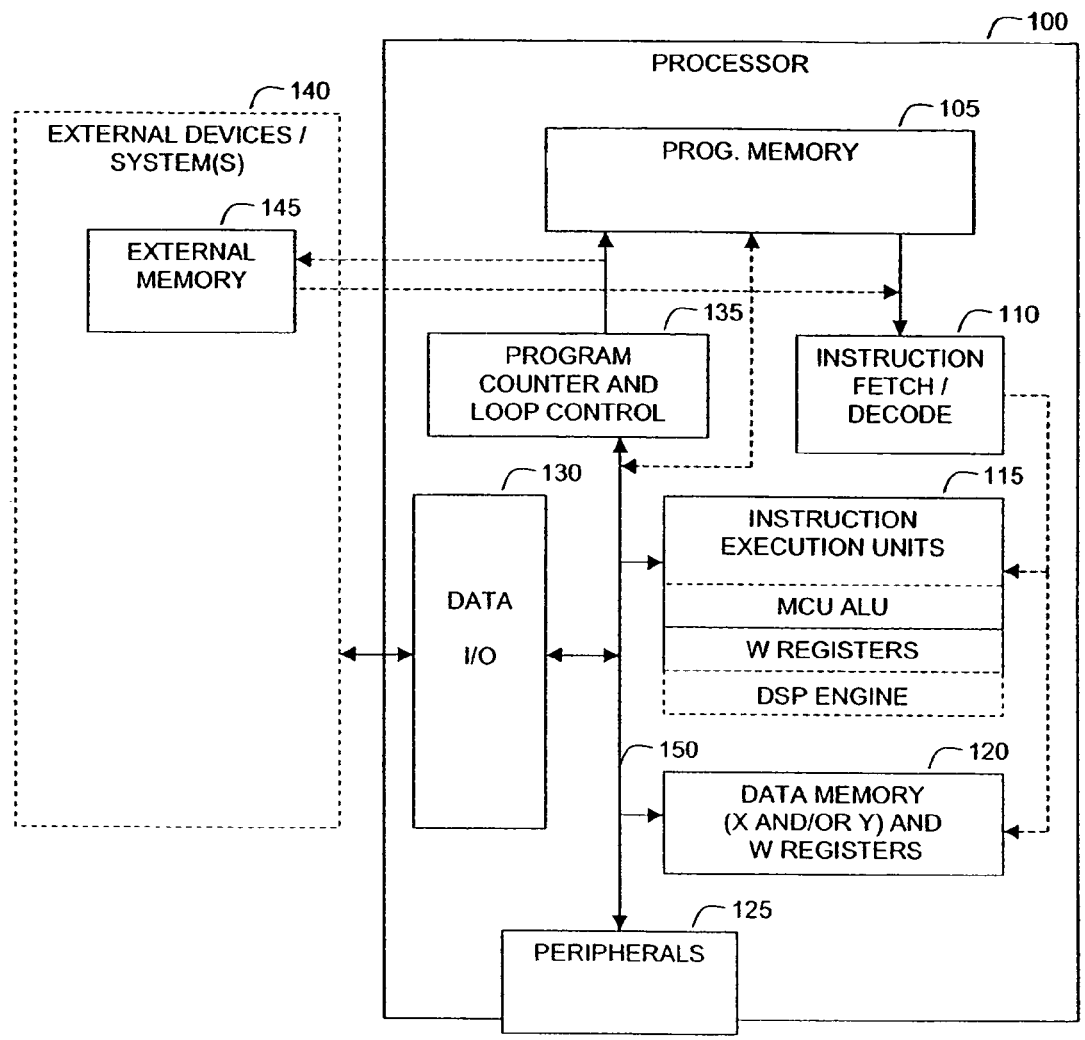
FIG. 1 depicts a functional block diagram of an embodiment of a processor chip within which embodiments of the present invention may find application.
Figure 2:
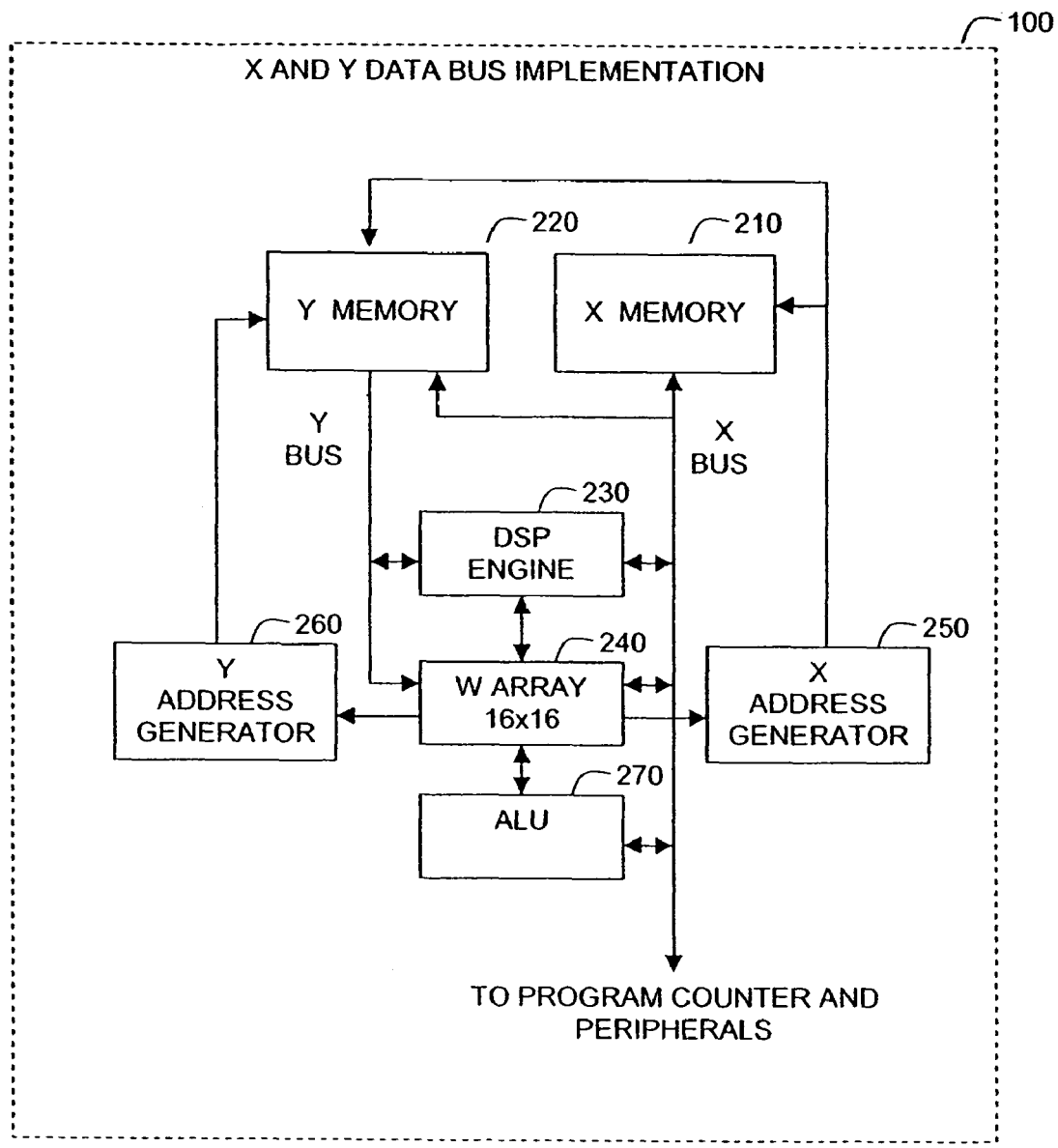
FIG. 2 depicts a functional block diagram of a data busing scheme for use in a processor, which has a microcontroller and a digital signal processing engine, within which embodiments of the present invention may find application.

In order to describe embodiments of the invention, an overview of pertinent processor elements is first presented with reference to FIGS. 1 and 2. The pointer trap functionality and interrupt processing is then described more particularly with reference to FIGS. 3-4.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of nonvolatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a von Neumann architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each of the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1-Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously. The following sequence of events may comprise, for example, the fetch instruction cycle:

Q1: Fetch Instruction
Q2: Fetch Instruction
Q3: Fetch Instruction
Q4: Latch Instruction into prefetch register, Increment PC The following sequence of events may comprise, for example, the execute instruction cycle for a single operand instruction:

Q1: latch instruction into IR, decode and determine addresses of operand data
Q2: fetch operand
Q3: execute function specified by instruction and calculate destination address for data
Q4: write result to destination The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

Figure 3:
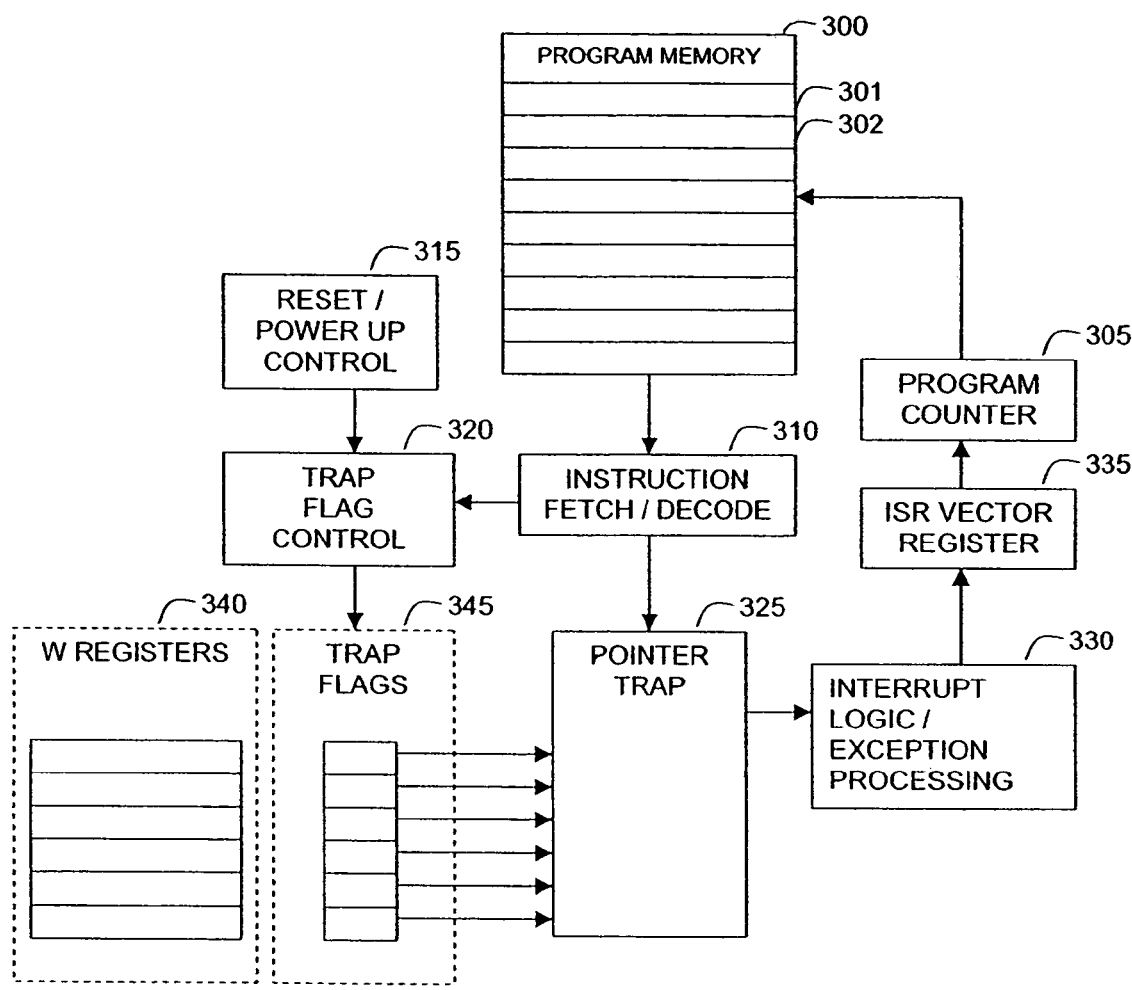
FIG. 3 depicts a functional block diagram of a processor configuration for implementing a pointer trap.

Q1: latch instruction into IR, decode and determine addresses of operand data
Q2: pre-fetch operands into specified registers, execute operation in instruction
Q3: execute operation in instruction, calculate destination address for data
Q4: complete execution, write result to destination Pointer Trap Embodiments FIG. 3 depicts a functional block diagram of a processor configuration for implementing a pointer trap. Referring to FIG. 3, the processor includes a program memory 300 with instructions 301 and 302 in a processing sequence. A program counter 305 is coupled to the program memory 300 and indicates the current instruction. An instruction fetch/decoder unit 310 is coupled to the program memory 300 and fetches the next instruction for execution as indicated by the program counter 305.

A reset/power up control unit 315 resides on the processor and is used to initialize the processor after a power up and after a processor reset. The unit 315 may be used to control when the processor begins to process instructions after a power on event. This may be performed by letting a predetermined number of clock cycles occur prior to releasing the processor to process instructions. During this start up period, the processor and oscillator clocking the processor are given time to stabilize. In the event of either a power on or a processor reset, and possibly other events, the reset/power up control unit 315 sends a reset control signal to the trap flag control unit 320 to reset the trap flags. This is done because the registers on the processor contain invalid data after a power on event or after a processor reset.

The trap flag control unit 320 is coupled to the reset/power up control unit 315 and the instruction fetch/decode unit 310. In response to receiving a reset control signal from the reset/power up control unit 315, the trap flag control unit 320 causes the trap flags to be reset to a predetermined value, which may be for example a zero or a one. The reset causes the trap flags 345 to indicate that their corresponding registers 340 include invalid data and hence should not be used to provide pointer values.

When an instruction that is being processed calls for writing to one of the registers, the instruction fetch/decode unit 310 generates a write control signal that identifies the particular registers that are being written into. The trap flag control unit 320 receives the write control signal and sets the trap flag 345 for the corresponding register that is being written into to a value that indicates that the register contains valid data. This value may be a zero or one and is the opposite value from the reset value stored after a processor power up or reset.

The trap flags 345 accordingly each relate to a corresponding register 340. In a reset state, a trap flag indicates that the corresponding register contains invalid data. In a set state, the trap flag indicates that the corresponding register contains valid data. The state of the trap flags 345 are reset upon a power on occurrence or a processor reset. The state of each trap flag 345 is thereafter changed to a set state after the corresponding register is written.

The pointer trap 325 is coupled to the instruction fetch/decode unit 310. When an instruction that is being processed calls for reading a pointer value (or other value) from one of the registers, the instruction fetch/decode unit 310 generates a read control signal that identifies the particular registers that are being written into. The pointer trap 325 receives the read control signal for the corresponding register that is being read from. The pointer trap 325 reads the trap flag of the register being read that is identified in the read control signal. When the trap flag corresponding to the register being read is in the reset condition, the pointer trap generates a trap control signal that is sent to the interrupt logic 330 to cause a trap interrupt. When the trap flag corresponding to the register being read is in the set condition, the pointer trap generates a trap control signal that is sent to the interrupt logic 330 that does not cause a trap interrupt. In this manner, the pointer trap 325 monitors instructions that are being processed and when the instructions will result in reading a pointer value that includes invalid data, a trap interrupt is triggered.

The interrupt logic 330 receives indications of exceptions from various units on the processor. The interrupt logic 330 thereafter arbitrates priority and determines which interrupt to service and when. Upon selection of the trap interrupt, the interrupt logic 330 identifies the trap interrupt to the ISR vector register 335.

The ISR vector register 335 is a look up table that includes the address of the first instruction of various interrupt service routines (ISRs). When the trap interrupt is being serviced, the address of the first instruction of the trap ISR is loaded into the program counter 305 which causes the trap ISR to be run. The trap ISR typically places the processor in a known condition to avoid processing errors.

Figure 4:
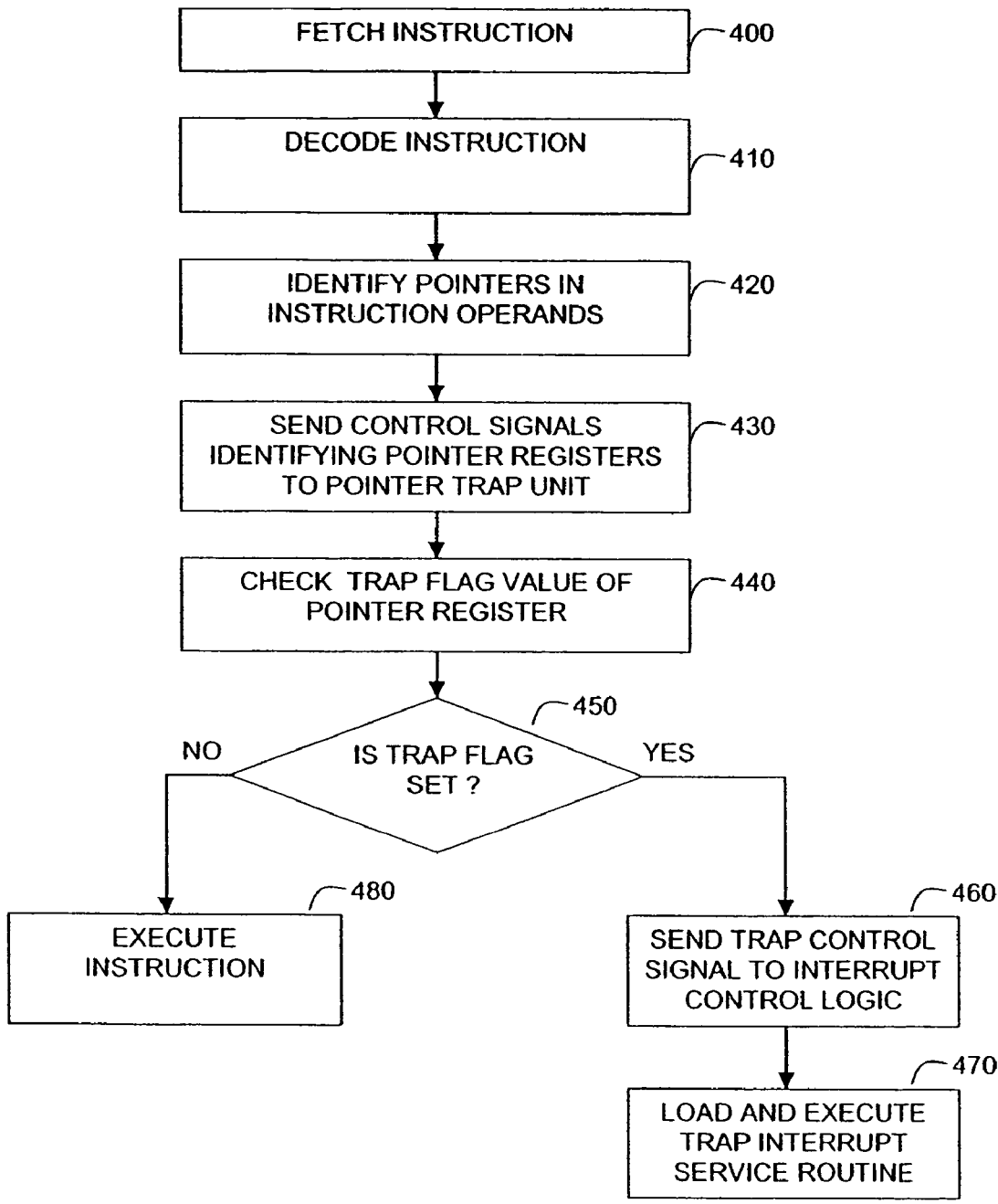
FIG. 4 depicts a method of processing instructions for detecting invalid pointers.

FIG. 4 depicts a method of processing instructions for detecting invalid pointers. Referring to FIG. 4, in step 400, the processor fetches an instruction. In step 410, the processor decodes the instruction. Then in step 420, the processor identifies pointers in the instruction operands. This may be performed by an instruction decoder on the processor. In step 430, the instruction decoder generates read control signals identifying pointer registers that are being read from by a current instruction. The read control signals generated may be sent to a pointer trap unit. In step 440, the processor checks the trap flag value corresponding to one or more of the pointer registers that are being read from. This may be performed by a pointer trap unit. In step 450, the processor determines whether the trap flag is set for one or more of the corresponding pointer registers being read from. If so, then step 460 begins. If not, then step 480 begins and the processor executes the instruction.

In step 460, the processor sends a trap control signal to interrupt control logic on the processor. The trap control signal indicates that a pointer trap exception has occurred. Then in step 470, the processor loads and executes a trap ISR to prevent propagating processing errors and to return the processor to a known state.

While specific embodiments of the present invention have been illustrated and described, it will be understood by those having ordinary skill in the art that changes may be made to those embodiments without departing from the spirit and scope of the invention. For example, FIG. 4 depicts an embodiment of the present invention where the instruction is prevented from being executed when the pointer trap flag is set. In alternative embodiments of the invention, the instruction may be executed even if the pointer trap flag is set. In this embodiment, the trap ISR may cause the processor to undo or correct for the instruction having been executed. In still other embodiments, an instruction may be executed when a trap flag is set but, in the case of a write instruction, the write to memory may be inhibited by a trap control signal. Many other variations are possible and within the scope of the present invention.

What is claimed is:

1. A method for preventing processing errors due to invalid pointers, comprising the steps of:
   providing a register associated with a processor wherein said register stores an address, and associating a trap flag with the register wherein the trap flag comprises a bit;
   upon reset of the processor, setting said bit to a first value, the first value indicating that the register has not been written with valid data;
   providing a pointer trap coupled with an instruction decode unit;
   decoding an instruction by the instruction decode unit;
   determining whether the instruction identifies said register in its operands;
   if the instruction identifies said register then sending at least one signal to the pointer trap;
   determining by the pointer trap if the trap flag is set to the first value; and
   if the trap flag is set to the first value, then preventing execution of said instruction and generating an exception signal by the pointer trap indicating to said processor that a processing exception has occurred.

2. The method of claim 1, wherein if the processing exception has occurred, then executing a trap interrupt service routine, wherein the trap interrupt service routine returns the processor to a known state.

3. The method of claim 2, wherein the trap interrupt service routine prevents errors from propagating during ensuing instructions processed by the processor.

4. The method of claim 1, wherein when an instruction that is being processed calls for writing to said register, the associated trap flag is set to an opposite value of said first value.

5. The method of claim 1, wherein the step of receiving one or more control signals includes receiving by the pointer trap one or more control signals from instruction fetch/decode logic indicating an instruction calls for the register to be used as a pointer.

6. A processor that identities invalid pointers, comprising:
   a processor capable of executing one or more instructions;
   an instruction decode unit for decoding said one or more instructions and for determining whether an instruction uses a predetermined register in its operands;
   a trap flag control unit coupled with said instruction decode unit;
   said predetermined register having a plurality of bits and being operative with the processor,
   a trap flag associated with the register, the trap flag comprising at least one bit which is set or reset by the trap flag control unit; and
   a pointer trap operative with the trap flag and said instruction decode unit, wherein the pointer trap receives a control signal from said instruction decode unit if said instruction identifies said register in its operands;
   wherein when the pointer trap receives the control signal from said instruction decode unit, the pointer trap determines if the at least one bit of the trap flag is set to a value indicating that the register has not been written with valid data, and if so, then the processor is operable to prevent execution of said instruction and the pointer trap generates an exception signal.

7. The processor of claim 6, wherein the processor executes a trap interrupt service routine if the exception signal is detected.

8. The processor of claim 7, wherein the register stores an address.

9. The processor of claim 6, wherein the trap flag control unit is operable to set the associated trap flag to a second value if an instruction is being processed that calls for writing to said register.

10. The processor of claim 6, wherein the register stores data.

11. The processor of claim 6, wherein the processor includes an instruction fetch/decode logic that sends the control signal to the pointer trap.

12. A method for preventing processing errors in a processor due to invalid pointers, comprising the steps of:
   providing a plurality of registers, and a plurality of trap flags wherein each trap flag is associated with a register from said plurality of registers wherein each trap flag comprises a bit;
   upon reset of the processor, setting each bit of the plurality of trap flags to a first value, the first value indicating that the associated register has not been written with valid data;
   providing a pointer trap;
   decoding an instruction and determining whether the instruction identifies one of said plurality of registers to be used when executing said instruction;
   if the instruction identifies the one of a plurality of registers to be used then sending at least one signal to the pointer trap;
   if the pointer trap received said at least one signal then determining by the pointer trap if a trap flag associated with the one of said plurality of registers is set to the first value;
   if the trap flag is set to the first value, then preventing execution of said instruction.

13. The method of claim 12, further comprising generating an exception signal, wherein if the processing exception has occurred, then executing a trap interrupt service routine.

14. The method of claim 13, wherein the trap interrupt service routine prevents errors from propagating during ensuing instructions processed by the processor.

15. The method of claim 12, wherein a register value of the one of said plurality of registers is to be used as data.

16. The method of claim 12, wherein a register value of the one of said plurality of registers is to be used as an address.

17. The method of claim 12, wherein the step of receiving one or more control signals includes receiving by the pointer trap one or more control signals from instruction fetch/decode logic indicating an instruction calls for the one of said plurality of registers to be used as a pointer.

18. A method for preventing processing errors due to invalid pointers, comprising the steps of:
   providing a register associated with a processor wherein said register stores an address, and associating a trap flag with the register wherein the trap flag comprises a bit;
   upon reset of the processor, setting said bit to a first value, the first value indicating that the register has not been written with valid data;
   providing a pointer trap coupled with an instruction decode unit;
   decoding an instruction by the instruction decode unit;
   determining whether the instruction identifies said register storing an address in its operands;
   if the instruction identifies said register storing an address then sending at least one signal to the pointer trap;
   determining by the pointer trap if the trap flag is set to the first value; and
   if the trap flag is set to the first value and said instruction is a write instruction, then generating a signal that inhibits a write to memory.

19. A method for preventing processing errors in a processor due to invalid pointers, comprising the steps of:
   providing a plurality of registers, and a plurality of trap flags wherein each trap flag is associated with a register from said plurality of registers wherein each trap flag comprises a bit;
   upon reset of the processor, setting each bit of the plurality of trap flags to a first value, the first value indicating that the associated register has not been written with valid data;
   providing a pointer trap;
   decoding an instruction and determining whether the instruction identifies one of said plurality of registers to be used when executing said instruction;
   if the instruction identifies the one of a plurality of registers to be used then sending at least one signal to the pointer trap;
   if the pointer trap received said at least one signal then determining by the pointer trap if a trap flag associated with the one of said plurality of registers is set to the first value;
   if the trap flag is set to the first value, then executing said instruction and generating an exception signal whereupon a trap interrupt service routine is executed, wherein said trap interrupt service routine undoes or corrects the effect of said instruction execution.

20. The method of claim 19, wherein the trap interrupt service routine prevents errors from propagating during ensuing instructions processed by the processor.

21. The method of claim 19, wherein a register value of the one of said plurality of registers is to be used as data.

22. The method of claim 19, wherein a register value of the one of said plurality of registers is to be used as an address.

23. The method of claim 19, wherein the step of receiving one or more signals includes receiving by the pointer trap one or more control signals from instruction fetch/decode logic indicating an instruction calls for the one of said plurality of registers to be used as a pointer.

24. A processor that identifies invalid pointers, comprising:
   a processor capable of executing one or more instructions;
   an instruction decode unit for decoding said one or more instructions and for determining whether an instruction uses a predetermined register in its operands;
   a trap flag control unit coupled with said instruction decode unit;
   wherein said predetermined register having a plurality of bits and being operative with the processor, said register storing an address;
   a trap flag associated with the register, the trap flag comprising at least one bit which is set or reset by the trap flag control unit; and
   a pointer trap operative with the trap flag and said instruction decode unit, wherein the pointer trap receives a control signal from said instruction decode unit if said instruction identifies said register in its operands;
   wherein when the pointer trap receives the control signal from said instruction decode unit, the pointer trap determines if the at least one bit of the trap flag is set to a value indicating that the register has not been written with valid data, and if so, then the processor is operable to execute said instruction and a trap interrupt service routine undoes or corrects the effect of said instruction execution.

25. The processor of claim 24, wherein the trap flag control unit is operable to set the associated trap flag to a second value if an instruction is being processed that calls for writing to said register.

26. The processor of claim 24, wherein the processor includes an instruction fetch/decode logic that sends the control signal to the pointer trap.

* * * * *